(12) United States Patent
Park

(10) Patent No.: US 11,168,723 B2
(45) Date of Patent: Nov. 9, 2021

(54) ANGULAR BEAM CONNECTING APPARATUS

(71) Applicant: MacPion Corporation, Incheon (KR)

(72) Inventor: Jae Hyun Park, Incheon (KR)

(73) Assignee: MACPION CORPORATION, Incheon (KR)

( * ) Notice: Subject to any disclaimer, the term of this patent is extended or adjusted under 35 U.S.C. 154(b) by 187 days.

(21) Appl. No.: 16/726,441

(22) Filed: Dec. 24, 2019

(65) Prior Publication Data

US 2020/0232493 A1 Jul. 23, 2020

(30) Foreign Application Priority Data

Jan. 22, 2019 (KR) .......................... 10-2019-0008158

(51) Int. Cl.
*F16B 7/18* (2006.01)
*F16B 7/22* (2006.01)
*F16F 9/00* (2006.01)

(52) U.S. Cl.
CPC ................ *F16B 7/187* (2013.01); *F16B 7/22* (2013.01); *F16F 9/003* (2013.01)

(58) Field of Classification Search
CPC .. F16B 7/18; F16B 7/182; F16B 7/187; F16B 7/025; F16B 7/04; F16B 7/0406;
(Continued)

(56) References Cited

U.S. PATENT DOCUMENTS 4,645,228 A * 2/1987 Bertonneau ............... A63C 5/02
280/603
5,785,359 A * 7/1998 Nagai ........................ F16B 7/04
285/191
(Continued)

FOREIGN PATENT DOCUMENTS

EP 0787907 A2 * 8/1997 ........... A47B 47/005
GB 2044203 A * 10/1980 ........... B65G 19/287
(Continued)

*Primary Examiner* — Jonathan P Masinick
(74) *Attorney, Agent, or Firm* — Lex IP Meister, PLLC

(57) ABSTRACT

Provided is an angular beam connecting apparatus. Angular beams are various types of angular beams with at least one groove that includes inner walls formed on both sides of the groove. The connecting apparatus assembled in the at least one groove of the respective angular beams includes: an upper member having at least one first pressing hole formed therein and at least one first inclined surface formed therein; a lower member a second pressing hole formed therein in correspondence to the first pressing hole and a second inclined surface formed therein while facing the first inclined surface; pressure units that are screwed through the first and second pressing holes of the upper and lower members; at least one pressure rod located in the space "a" formed between the first and second inclined surfaces by placing the first and second inclined surfaces of the upper and lower members to face each other, wherein the pressure units of the connecting member penetrate the first and second pressing holes to have the upper and lower members closely contact each other, and the at least one pressure rod located in the space "a" between the first and second inclined surfaces is pushed outward to fix two angular beams and to extend the length of the structure formed by the two angular beams.

8 Claims, 14 Drawing Sheets

(58) Field of Classification Search
CPC .... F16B 7/0426; F16B 5/0088; F16B 5/0258; F16B 2/14; F16B 2/065
See application file for complete search history.

(56) References Cited

U.S. PATENT DOCUMENTS

| | | | | |
|---|---|---|---|---|
| 5,988,930 | A * | 11/1999 | Liebetrau | F16B 37/045 403/279 |
| 6,870,489 | B2 * | 3/2005 | Cybulski | G08G 1/042 340/916 |
| 2011/0176860 | A1 * | 7/2011 | Lin | F16B 7/025 403/119 |

FOREIGN PATENT DOCUMENTS

| | | | | |
|---|---|---|---|---|
| KR | 20-0325711 | | 8/2003 | |
| KR | 1020190008158 | | 6/2019 | |
| WO | WO-2004085862 | A1 * | 10/2004 | ............. F16B 7/182 |

* cited by examiner

ANGULAR BEAM CONNECTING APPARATUS

TECHNICAL FIELD

The present invention relates to a connecting apparatus for lengthily connecting grooved angular beams such as a grooved profile or pipe.

BACKGROUND ART

In general, as an apparatus for connecting the angled, grooved angular beams, a variety of connecting apparatuses are known that bring the end of the one angular beam to the end of the other angular beam so as to vertically or laterally connect the middle portion of the angular beams. For example, a joint fixing block of a profile pipe is disclosed in Korean Patent Application Publication No. 10-2014-0054468 (published on May 9, 2014).

Moreover, an apparatus which connects profiles in the vertical direction in correspondence to the intermediate portion, side portion, etc. of the profiles which have formed grooves in one direction, two directions, four directions, etc. is also known. For example, the technology of connecting an angular beam vertically on one side surface of another angular beam through a profile connection adapter is disclosed in Korean Utility Model Application Publication No. 20-2011-0004972 (published on May 18, 2011).

Connecting apparatuses or connecting methods for the longitudinal extension of these various types of profile-shaped, pipe-shaped, or rail-shaped grooved members are mostly performed by welding without connecting apparatuses. Otherwise, binding members for connecting various pipes, which are connected to each other by a ring-shaped or corresponding two-way locking devices, locking members, etc., formed on the outer circumferential surfaces of the pipes are known as the connecting apparatuses or connecting methods for the lengthy extension of these various types of profile-shaped, pipe-shaped, or rail-shaped grooved members.

In addition, in order to extend a square bar such an angular member, and the like, side connecting members of a profile angular beam are also disclosed in Korean Patent Application Publication Nos. 10-2014-0054468 and 20-2010-0007565 (published on Jul. 26, 2010). In particular, a connecting structure of profiles is disclosed in U.S. Pat. No. 6,712,540 (published on Mar. 30, 2004). U.S. Pat. No. 6,712,540 also discloses a member for vertical side connections rather than longitudinal connections. The above conventional art references disclose orthogonal features for the connection, and it is also difficult to apply the connecting apparatuses of the above conventional art references to a longitudinal profile length connecting apparatus.

Meanwhile, in the related art, U.S. Pat. No. 9,657,760 (published on May 23, 2017) is known as an apparatus for inserting a plate into a space of a member having a U-shaped groove to fix the plate with a separate inserting and attachment device. U.S. Pat. No. 9,657,760 does not disclose a connecting apparatus for linearly connecting corresponding two members themselves as a fixing device of a panel that is vertically fixed by using various parts, but discloses the feature of suspending and fixing an insertion plate body by fixing the insertion plate body in a groove. Thus, the apparatus disclosed in U.S. Pat. No. 9,657,760 is not suitable as a connecting apparatus In addition, fixing devices between two members using members having various corresponding inclined surfaces are known in Korean Patent Nos. 10-1682628 (published on Nov. 29, 2016) and 10-0492094 (published on May 29, 2005), Korean Patent Application Publication Nos. 10-2014-0054468 (published on May 9, 2014) and 20-2011-0004972 (published on May 18, 2011), and the like. However, the fixing devices disclosed in the above conventional art references also cannot extend two angular beams with open grooves in the longitudinal direction thereof, and are nothing but a structure that connects the angular beams from the side.

In addition, U.S. Pat. No. 5,988,930 (published on Nov. 23, 1999), as shown in the accompanying drawings, FIGS. 17A and 17B, is known as an apparatus for installing an angular beam having a groove upwards above profile angular beams having grooves. That is, the connecting member and the connecting apparatus for the angular beams correspond to, as fastening devices for the mechanical interconnection of the two profile member ends including the groove strips in the cracked straps, a connecting member and a connecting apparatus with components such as such as screw holes, through holes, screws, groove strips, and mounting grooves. U.S. Pat. No. 5,988,930 discloses a structure that protrudes on the surface and is inserted into the mounting groove of the profile member to be connected by tightening the screw in a cold deforming manner, and then expands in the interior to then be locked. U.S. Pat. No. 5,988,930 discloses a structure that cannot be connected as a general profile, because only the angular beam formed with a protruding locking jaw protruding on both sides of the upper opening of the inlet formed with a groove can be used or such a locking jaw should be formed and used.

SUMMARY OF THE INVENTION

Technical Problem

It is an object of the present invention to provide a connecting apparatus for extending the length of a corresponding angular beam (profile) in the longitudinal direction, unlike the connecting members (adapters, joint blocks, etc.) for connecting the conventional grooved angular members, profiles, etc. in the perpendicular or vertical direction.

The connecting apparatus according to the present invention is capable of extending the whole length of the angular beams by assembling and installing the connecting apparatus in the grooves of the linear corresponding two grooved angular beams.

It is an object of the present invention to provide an angular beam connecting apparatus, which is capable of providing a simple, efficient fastening apparatus (connecting apparatus) which is fixed in a groove of an angular beam of a new method that the conventional connecting member or the connecting apparatus fails to implement.

It is an object of the present invention to provide a connecting apparatus of an angular beam according to an embodiment of the present invention, which is close contact with and fixed to an inner wall of a groove of the angular beam by a pressure rod that is pushed out of a space in an inclined surface between upper and lower members by tightening the upper and lower members to be in close contact with the upper and lower portions thereof.

It is an object of the present invention to provide a connecting apparatus which is more tightly fixed by a deformable pressure rod structure in a needle bar state from one side of a shape in addition to a contact surface shape of a circular cross section, trapezoid, rhombus, etc. which is fixed by contacting an inner wall of a groove of an angular beam through the pressure rod of the connecting apparatus of the angular beam according to an embodiment of the present invention.

The angular beam connecting apparatus according to an embodiment of the present invention has an object to provide an angular beam connecting apparatus suitable for being installed in the longitudinal direction as the angular beams of various cross-sectional structures.

The angular beams applied for the angular beam connecting apparatus according to an embodiment of the present invention has an object to provide an angular beam connecting apparatus suitable for a rail-shaped member having grooves in upper and lower portions and an extension portion therebetween.

Technical Solution

According to an aspect of the present invention for achieving the above object, there is provided a connecting apparatus comprising:
a pair of upper members having at least one first pressing hole formed therein and at least one first inclined surface formed therein, respectively; a lower member opposing the pair of upper members in which at least one second pressing hole is formed in correspondence to the at least one first pressing hole, and at least one second inclined surface is formed in correspondence to the at least one first inclined surface so as to form a space in which the first and second inclined surfaces are opened outward; a plurality of pressure units for tightly coupling the upper and lower members by coupling the first and second pressing holes of the upper and lower members in a screw engagement manner; and at least one pressure rod in which the first and second inclined surfaces of the upper and lower members are arranged to face each other to be placed in a space "a" formed between the first and second inclined surfaces so that the upper and lower members are in close contact with each other and the space "a" is gradually narrowed and the at least one pressure rod is pushed outward.

According to another aspect of the present invention, there is provided an angular beam connecting apparatus for connecting angular beams each having at least one groove having both inner side walls formed therein, respectively, for achieving the above object according to the present invention, the an angular beam connecting apparatus comprising:
a pair of upper members having at least one first pressing hole formed therein and at least one first inclined surface formed therein, respectively; a lower member opposing the pair of upper members in which at least one second pressing hole is formed in correspondence to the at least one first pressing hole, and at least one second inclined surface is formed in correspondence to the at least one first inclined surface so as to form a space in which the first and second inclined surfaces are opened outward; a plurality of pressure units for tightly coupling the upper and lower members by coupling the first and second pressing holes of the upper and lower members in a screw engagement manner; and at least one pressure rod in which the first and second inclined surfaces of the upper and lower members are arranged to face each other to be placed in a space "a" formed between the first and second inclined surfaces so that the upper and lower members are in close contact with each other and the space "a" is gradually narrowed and the at least one pressure rod is pushed outward.

The pressure units of the connecting apparatus penetrate the first and second pressing holes to have the upper and lower members closely contact each other.

The at least one pressure rod located in the space "a" between the first and second inclined surfaces is pushed outward and fixed to the inner walls of the grooves of the angular beams.

Therefore, the length of the structure formed by the angular beams can be extended by connecting the two angular beams.

In the angular beam connecting apparatus in order to achieve the above object, a groove is formed on at least one of the outer surfaces forming the respective surfaces of the angular beams.

In the angular beam connecting apparatus in order to achieve the above object, at least one groove is formed on the outer peripheral surface of the angular beams having a cylindrical cross section.

In the angular beam connecting apparatus in order to achieve the above object, the angular beams are rail-like members having grooves formed so that the connecting apparatuses are assembled in the upper and lower portions of the angular beams, and an extension portion formed between the upper and lower portions.

In the angular beam connecting apparatus in order to achieve the above object, the pressure rod has preferably a circular cross section.

In the angular beam connecting apparatus in order to achieve the above object, the pressure rod has preferably a trapezoidal cross section.

In the angular beam connecting apparatus in order to achieve the above object, the pressure rod has preferably a rhombic cross section.

Advantageous Effects

As described above, an angular beam connecting apparatus according to the present invention exhibits an effect of providing a connecting apparatus enabling linear connection and extension of any grooved angular beams by improving the problem of the angular beam connecting apparatus caused by the conventional connecting method employing locking and fastening with the locking jaw and the like after being inserted and mounted into the groove in the angular beam.

An angular beam connecting apparatus according to the present invention exhibits an effect of providing a connecting apparatus enabling linear or longitudinal connection and extension of any grooved angular beams by overcoming the installation limitations of the conventional connecting apparatus such as the adapter, the connecting block, etc., which has enabled to connect the grooved profiles of the various cross sections in the perpendicular direction or the vertical direction.

An angular beam connecting apparatus according to the present invention has an effect of providing an angular beam connecting apparatus for connecting two angular beams such as linear angular beams having grooves, grooved profiles, and the like, in which the structure of the angular beams can be extended without welding in extending the structural length, thereby improving a post-processing of the welded portion.

DETAILED DESCRIPTION OF THE INVENTION

Hereinafter, exemplary embodiments of the present invention will be described in detail with reference to the accompanying drawings.

In describing the embodiments of the present invention, descriptions of technical features that are well known in the technical field to which the present invention belongs and are not directly related to the present invention will be omitted.

In addition, the technical terms used in the present specification should be interpreted as meanings generally understood by those skilled in the art to which the present invention belongs, unless specifically defined otherwise. It should not be interpreted in the sense of being excessively comprehensive or in the sense of being excessively reduced.

Also, the singular forms used herein include the plural forms unless the context indicates otherwise.

The term 'connecting apparatus' used in the present invention is comprehensively defined to comprise fasteners, such as bolts that are assembled to be connected through grooves of angular beams, angular members, linear members, and profiles having unspecified grooves formed therein, two-piece members (a pair of upper and lower members) that are fastened by the fasteners in screw holes and closely in contact with each other as opposed to each other, and rods that are pushed outwards by the inclined surfaces between the upper and lower members (pressure rods having various cross-sectional shapes).

The term 'angular beam' used in the present invention refers to all linear members (profiles) having a cross-section or a circular cross-section and extending in the longitudinal direction along a line forming an angle such as a triangle, a rectangle, a pentagon, and each of these angles. At least one groove is formed in common on either side of the angular beam.

The term 'connecting apparatus' used in the present invention refers to a combination extending in the lengthwise direction by closely connecting two different angular beams having a groove formed therein and then inserting and fixing the connecting apparatus in the groove therebetween.

EXAMPLE 1

Figure 1:
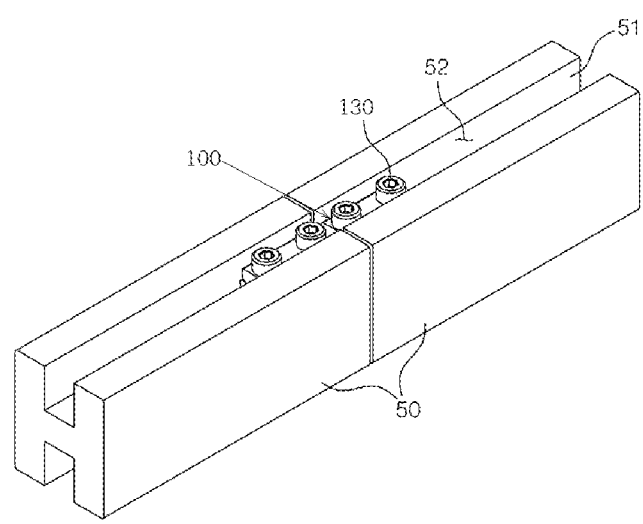
FIG. 1 is a perspective view of a connected state of an angular beam connecting apparatus according to a first embodiment of the present invention.
Figure 2:
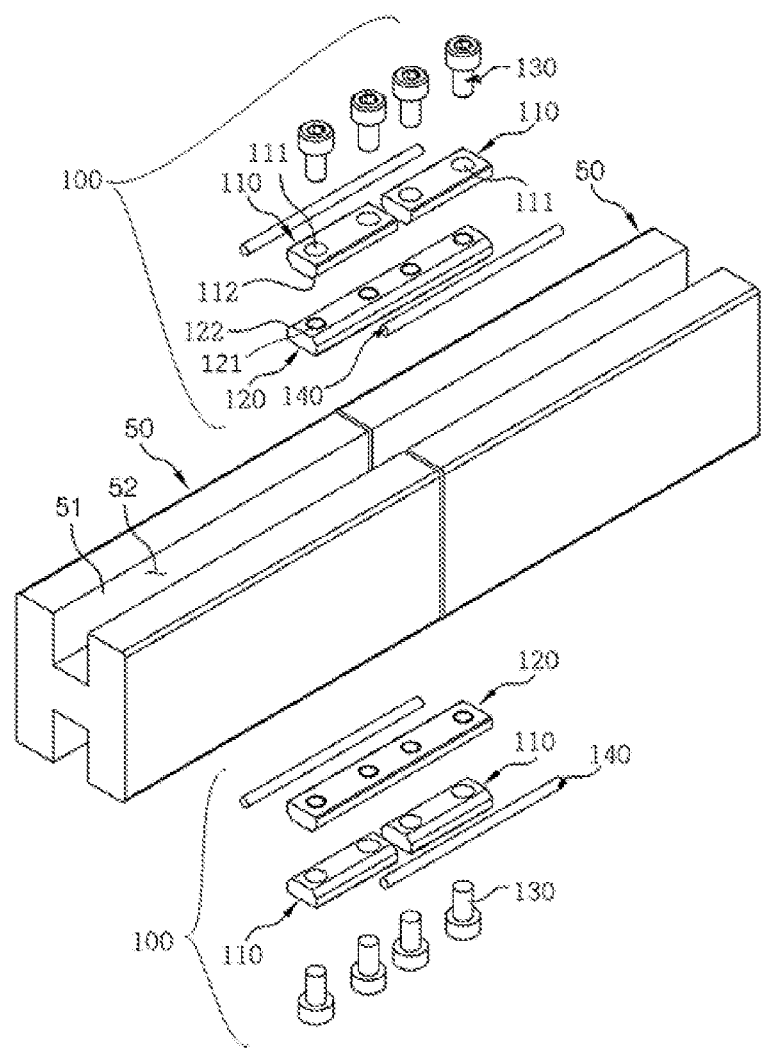
FIG. 2 is a perspective view of a disconnected state of the angular beam connecting apparatus according to the first embodiment of the present invention.
Figure 3:
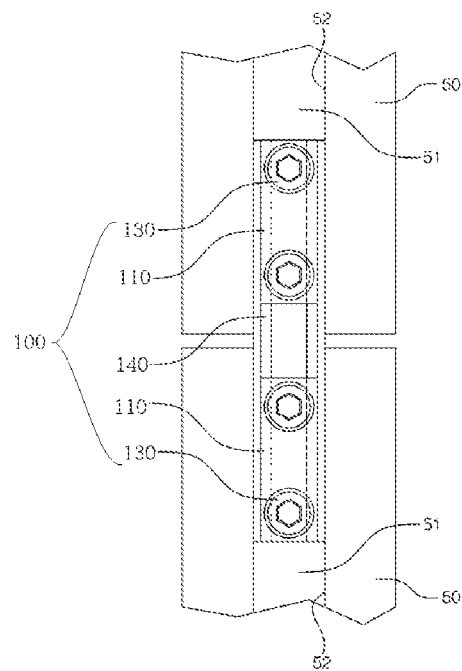
FIG. 3 is a plan view schematically showing a cut part of the angular beam connecting apparatus according to the first embodiment of the present invention.
Figure 4A:
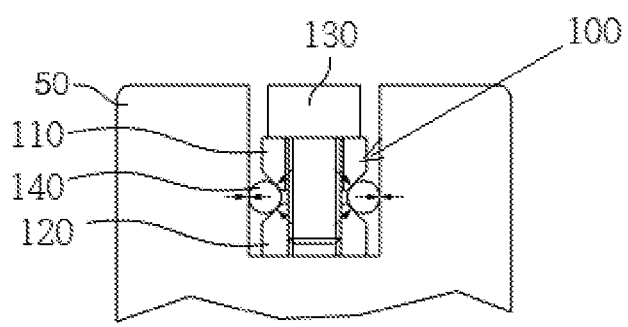
FIGS. 4A, 4B and 4C are cross-sectional views of a bonded state of an angular beam connecting apparatus according to an embodiment of the present invention in which the connecting apparatus is implemented in the groove of the angular beam.
Figure 4B:
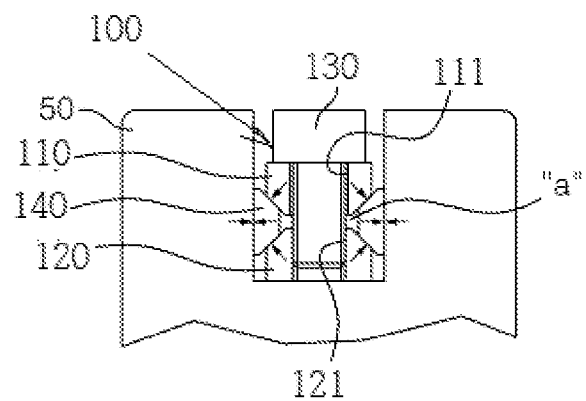
Figure 4C:
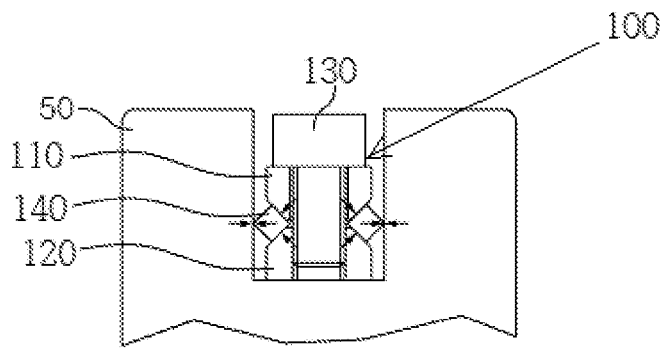
Figure 5A:
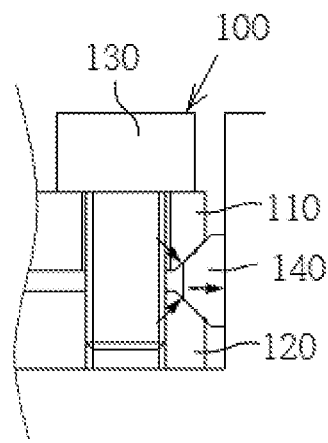
FIGS. 5A, 5B and 5C are enlarged cross-sectional views of an essential part of an angular beam connecting apparatus according to an embodiment of the present invention.
Figure 5B:
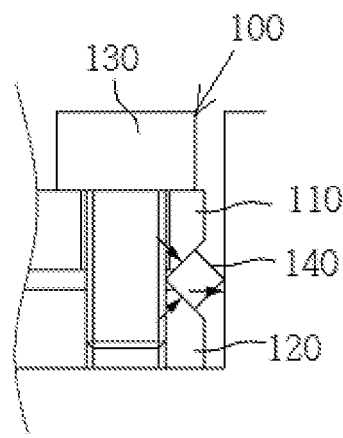
Figure 5C:
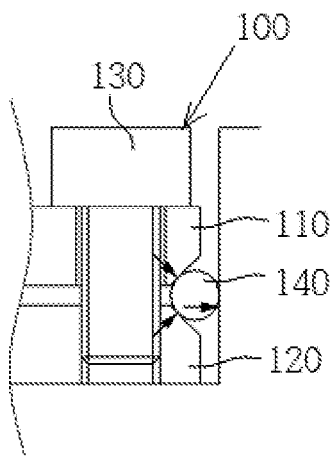

FIG. 1 is a perspective view of a connected state of an angular beam connecting apparatus according to a first embodiment of the present invention. FIG. 2 is a perspective view of a disconnected state of the angular beam connecting apparatus according to the first embodiment of the present invention. FIG. 3 is a plan view schematically showing a cut part of the angular beam connecting apparatus according to the first embodiment of the present invention. FIGS. 4A, 4B and 4C are cross-sectional views of a bonded state of an angular beam connecting apparatus according to an embodiment of the present invention in which the connecting apparatus is implemented in the groove of the angular beam. FIGS. 5A, 5B and 5C are enlarged cross-sectional views of an essential part of an angular beam connecting apparatus according to an embodiment of the present invention.

As illustrated in FIGS. 1 to 5C, a connecting apparatus 100 according to an embodiment of the present invention includes: an upper member 110, a lower member 120, a plurality of pressure units 130, and a pair of pressure rods 140.

The upper member 110 is formed of a pair of upper members 110 but may be formed as one upper member 110. The upper member 110 may be formed of a hexahedron having a thin and long shape. The hexahedron of the upper member 110 forms a cross-sectional shape of widening upward and narrowing downward (longer upper and shorter lower trapezoid) on the basis of two shorter surfaces of four vertical surfaces (thickness), and first inclined surfaces 112 are formed on both sides of this cross section. At least one first pressing hole 111 penetrating the upper and lower portions of the hexahedron is formed on the upper surface of the hexahedron, and a spiral is formed on an inner surface of the first pressing hole 111.

The lower member 120 is a hexahedron having a thin thickness in the same shape corresponding to longer than the combined length of the pair of upper members 110. The hexahedron of the lower member 120 forms a cross-sectional shape of narrowing upward and widening downward (shorter upper and longer lower trapezoid) on the basis of two shorter surfaces among four vertical surfaces and second inclined surfaces 122 corresponding to the first inclined surfaces 112 are formed on both sides of this cross section. At least one second pressing hole 112 penetrating the upper and lower portions corresponding to the first pressing hole 111 is formed on the upper surface of the hexahedron.

The pressure units 130 are bolts or the like having a thread of a predetermined length to be screwed through the first and second pressing holes 111 and 121, and The pressure units 130 are placed to penetrate the first and second pressing holes 111 and 112 and tightened to be screwed into the first and second pressing holes 111 and 112 (screw fit) in the state in which the upper and lower members 110 and 120 correspond to each other, such that a space "a" between the first and second inclined surfaces 112 and 122 of the upper and lower members 110 and 120 is narrowed.

The pressure rod 140 is provided between the first and second inclined surfaces 112 and 122 on both sides of the upper and lower members 110 and 120 to face each other so that the pressure rod 140 is gradually opened from the inside to the outside and is placed in the space "a" formed between the first and second inclined surfaces 112 and 122 at the time of assembly. When the pressure unit 130 is gradually pressed while being screw-fitted with the first and second pressure holes 111 and 121 in a state in which the upper and lower members 110 and 120 correspond to each other, The pressure rod 140 positioned between the first and second inclined surfaces 112 and 122 of the upper and lower members 110 and 120 is pushed out from the first and second inclined surfaces 112 and 122 that are in contact with each other up and down, and is in close contact with and connected with the inner wall surface 52 of the groove 51 of the angular beam 50.

Preferably, the spiral of the pressure unit 130 is carried out in a direction in which the upper and lower members 110 and 120 closely contact each other in a spiral direction of the first and second pressing holes 111 and 121. Although the lower spiral of the pressure unit 130 penetrates the first pressing hole 111 as it is, the second pressing hole 121 may be formed such that the lower spiral of the pressure unit 130 may be coupled to the second pressing hole 121 in a screw fit manner to raise the lower member 120. The screw fitting coupling structure of the pressure unit 130 and the first and second pressing holes 111 and 121 may use a known screw fitting structure using a spiral so that the upper and lower members 110 and 120 are closely contact with each other in a state where the upper and lower members 110 and 120 are laminated at a predetermined interval. The screw fitting structure of the pressure unit 130 and the pressing holes 111 and 121 may employ a number of known joining structures.

The angular beam connecting apparatus using the connecting apparatus 100 according to an embodiment of the present invention is implemented to make the ends of the angular beams 50 corresponding to each other correspond to each other without gaps, and to have the connecting apparatus 100 interposed therebetween.

The whole implementation of the connection member 100 according to an embodiment of the present invention can be performed by being assembled in the longitudinal direction in the grooves 51 of the angular beams 50 from above as shown in FIG. 3.

The angular beam connecting apparatus for connecting the angular beams 50 to which the connecting apparatus 100 is applied is implemented as shown in FIGS. 4A, 4B and 4C, and can be fixed in close contact with the inner side walls 52 of both sides of the groove 51 through FIGS. 5A, 5B and 5C.

That is, as shown in FIGS. 4A and 5A, the lower member 120 is placed with the second inclined surface 122 facing up, the pressure rod 140 of the circular cross section is placed on the second inclined surface 122, and the first inclined surfaces 112 of the pair of upper members 110 are disposed on the second inclined surface 122 so as to cover the second inclined surface 122 (a space "a" of a predetermined interval is formed between the upper and lower members 110 and 120).

Thereafter, the gaps between the upper and lower members 110 and 120 are gradually narrowed and the upper and lower members 110 and 120 are in close contact with each other by being screwed together while the pressure unit 130 is inserted into the first pressing hole 111 and the second pressing hole 121. At the same time, the pressure rods 140 located between the first and second inclined surfaces 112 and 122 are pushed outward and supported to be in close contact with the inner walls 52 of the groove 51. As the inner walls 52 of the angular beam 50 are supported by the close contact of both sides of the pressure rod 140, the two angular beams 50 corresponding to the longitudinal ends thereof accomplish a connection state. The connecting apparatus enables providing of an extending apparatus for extending the angular beams 50 such as linear angle members, profiles, etc. that are applied to all industries, and the length of the entire structure formed by the angular beams can be extended without welding. The disadvantages of the conventional connection method such as a connecting method by welding, a connecting method of forming a protruding jaw on both sides of the upper portion of the groove, and hooking and fixing as a hook structure inserted into the groove, and the like can be solved.

Meanwhile, although the pressure rod 140 of the connecting apparatus 100 according to an embodiment of the present invention applied to the accompanying drawings FIGS. 4A and 5A is a pressure rod 140 of a circular cross section, the trapezoidal cross section of the wider surface of the outer side can be formed as the pressure rod 140, as shown in FIGS. 4B and 5B, and thus adhesive force can be heightened. Alternatively, as shown in FIGS. 4C and 5C, the rhombic pressurizing rod 140 may be applied to fix the inner wall 52 of the groove 51 to be in close contact with a pointed surface. In addition, a suitable cross-sectional shape of all the pressure rods 140 in close contact with the inner wall 52 may be possible. That is, one side of the deformed circular cross section may be implemented by sharply forming each side, and may be fixed by using one side of a pentagonal form. All the pressure rods 140 may form contact surfaces that slip on the first and second inclined surfaces 112 and 122, and any one surface of the slip surface may form a needle bar that is in close contact with the inner wall 52 of the groove 51.

EXAMPLE 2

Figure 6:
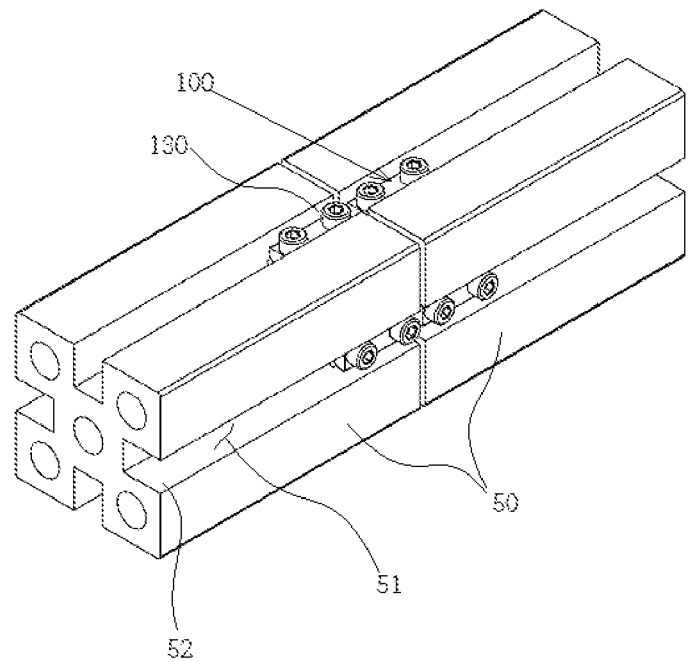
FIG. 6 is a perspective view of a connected state of an angular beam connecting apparatus according to a second embodiment of the present invention.
Figure 7:
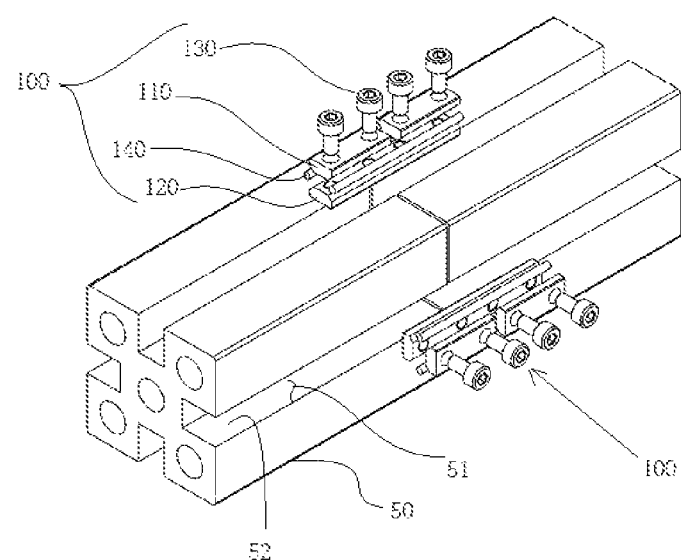
FIG. 7 is a perspective view of a disconnected state of the angular beam connecting apparatus according to the second embodiment of the present invention.
Figure 8A:
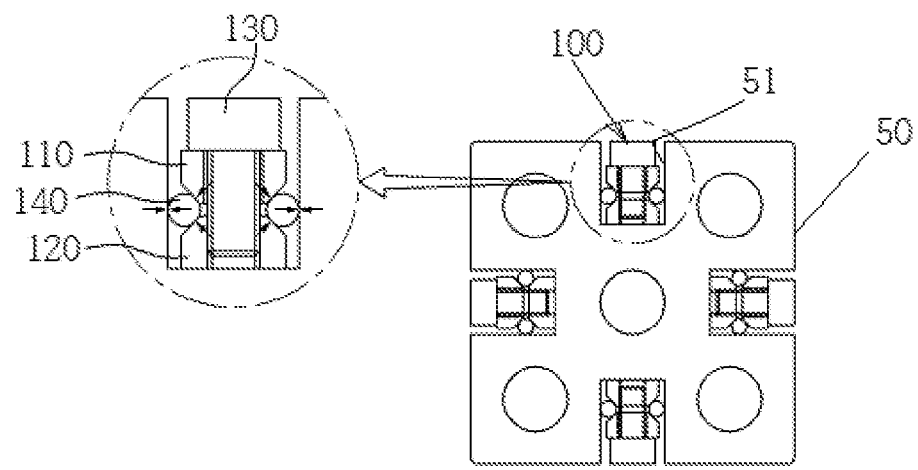
FIGS. 8A, 8B and 8C are enlarged cross-sectional views of an essential part of an angular beam connecting apparatus according to an embodiment of the present invention in which the connecting apparatus is implemented in the groove of the angular beam.
Figure 8B:
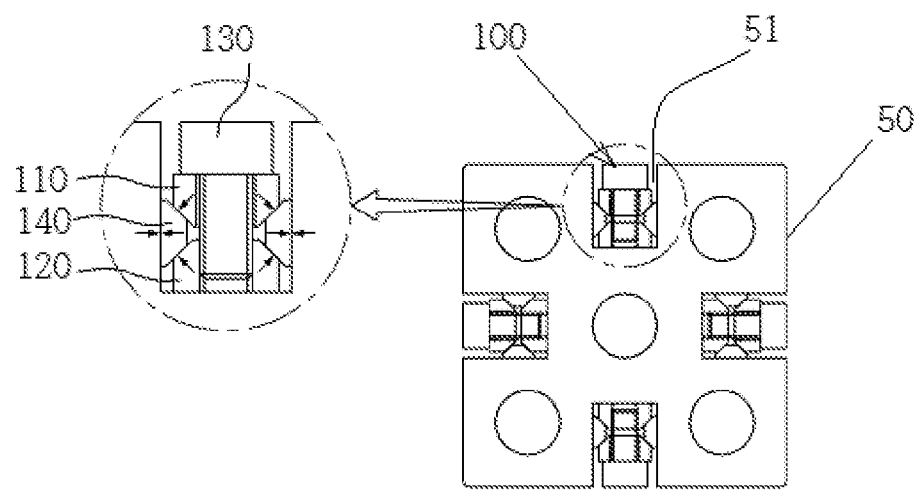
Figure 8C:
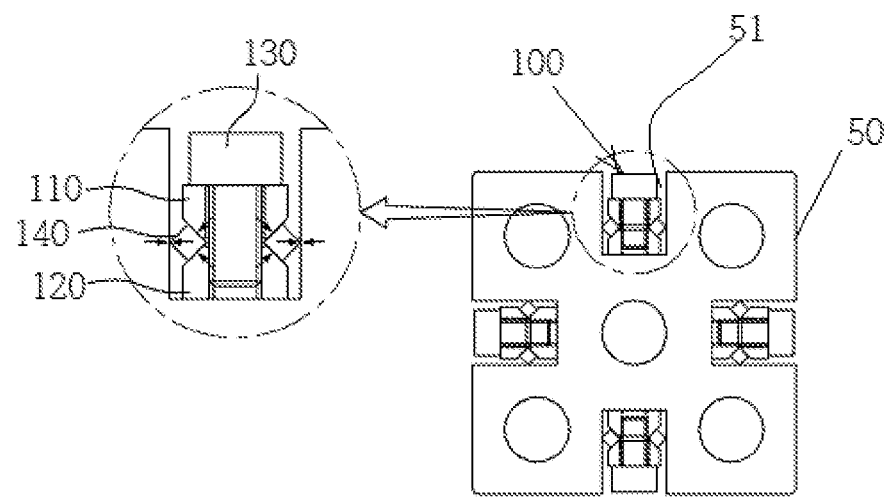

FIG. 6 is a perspective view of a connected state of an angular beam connecting apparatus according to a second embodiment of the present invention. FIG. 7 is a perspective view of a disconnected state of the angular beam connecting apparatus according to the second embodiment of the present invention. FIGS. 8A, 8B and 8C are enlarged cross-sectional views of an essential part of an angular beam connecting apparatus according to an embodiment of the present invention in which the connecting apparatus is implemented in the groove of the angular beam.

As illustrated in FIGS. 6 to 8C, a connecting apparatus 100 according to an embodiment of the present invention includes: a pair of upper members 110, a lower member 120, a plurality of pressure units 130, and a pair of pressure rods 140.

The upper member 110 is formed of a pair of upper members 110 but may be formed as one upper member 110. The upper member 110 may be formed of a hexahedron having a thin and long shape. The hexahedron of the upper member 110 forms a cross-sectional shape of widening upward and narrowing downward (longer upper and shorter lower trapezoid) on the basis of two shorter surfaces of four vertical surfaces (thickness), and first inclined surfaces (sloped surfaces) 112 are formed on both sides of this cross section. At least one first pressing hole 111 penetrating the upper and lower portions of the hexahedron is formed on the upper surface of the hexahedron, and a spiral is formed on an inner surface of the first pressing hole 111.

The lower member 120 is a hexahedron having a thin thickness in the same shape corresponding to longer than the combined length of the pair of upper members 110. The hexahedron of the lower member 120 forms a cross-sectional shape of narrowing upward and widening downward (shorter upper and longer lower trapezoid) on the basis of two shorter surfaces among four vertical surfaces and second inclined surfaces 122 corresponding to the first inclined surfaces 112 are formed on both sides of this cross section. At least one second pressing hole 112 penetrating the upper and lower portions corresponding to the first pressing hole 111 is formed on the upper surface of the hexahedron.

The pressure units 130 are bolts or the like having a thread of a predetermined length to be screwed through the first and second pressing holes 111 and 121, and The pressure units 130 are placed to penetrate the first and second pressing holes 111 and 112 and tightened to be screwed into the first and second pressing holes 111 and 112 (screw fit) in the state in which the upper and lower members 110 and 120 correspond to each other, such that a space "a" between the first and second inclined surfaces 112 and 122 of the upper and lower members 110 and 120 is narrowed.

The pressure rod 140 is provided between the first and second inclined surfaces 112 and 122 on both sides of the upper and lower members 110 and 120 to face each other so that the pressure rod 140 is gradually opened from the inside to the outside and is placed in the space "a" formed between the first and second inclined surfaces 112 and 122 at the time of assembly. When the pressure unit 130 is gradually pressed while being screw-fitted with the first and second pressure holes 111 and 121 in a state in which the upper and lower members 110 and 120 correspond to each other, The pressure rod 140 positioned between the first and second inclined surfaces 112 and 122 of the upper and lower members 110 and 120 is pushed out from the first and second inclined surfaces 112 and 122 that are in contact with each other up and down, and is in close contact with and connected with the inner wall surface 52 of the groove 51 of the angular beam 50.

Preferably, the spiral of the pressure unit 130 is carried out in a direction in which the upper and lower members 110 and 120 closely contact each other in a spiral direction of the first and second pressing holes 111 and 121. Although the lower spiral of the pressure unit 130 penetrates the first pressing hole 111 as it is, the second pressing hole 121 may be formed such that the lower spiral of the pressure unit 130 may be coupled to the second pressing hole 121 in a screw fit manner to raise the lower member 120. The screw fitting coupling structure of the pressure unit 130 and the first and second pressing holes 111 and 121 may use a known screw fitting structure using a spiral so that the upper and lower members 110 and 120 are closely contact with each other in a state where the upper and lower members 110 and 120 are laminated at a predetermined interval. The screw fitting structure of the pressure unit 130 and the pressing holes 111 and 121 may employ a number of known joining structures.

The angular beam connecting apparatus using the connecting apparatus 100 according to an embodiment of the present invention is implemented to make the ends of the angular beams 50 corresponding to each other correspond to face each other without gaps, and to have the connecting apparatus 100 interposed therebetween.

The whole implementation of the connection member 100 according to an embodiment of the present invention can be performed by being assembled in the longitudinal direction in the four grooves 51 of the angular beams 50 in the up and down and left and right directions as shown in FIG. 7.

The angular beam connecting apparatus for connecting the angular beams 50 to which the connecting apparatus 100 is applied is implemented as shown in FIGS. 8A, 8B and 8C, and can be fixed in close contact with the inner side walls 52 of both sides of the groove 51 through FIGS. 8A, 8B and 8C.

That is, as shown in FIG. 8A, the lower member 120 is placed with the second inclined surface 122 facing up, the pressure rod 140 of the circular cross section is placed on the second inclined surface 122, and the first inclined surfaces 112 of the pair of upper members 110 are disposed on the second inclined surface 122 so as to cover the second inclined surface 122 (a space "a" of a predetermined interval is formed between the upper and lower members 110 and 120).

Figure 9:
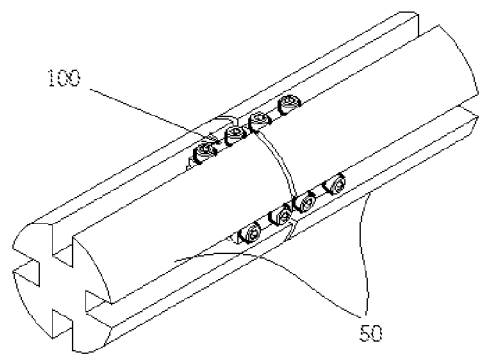
FIG. 9 is a perspective view of a connected state of an angular beam connecting apparatus according to a third embodiment of the present invention.

Meanwhile, although the pressure rod 140 of the connecting apparatus 100 according to an embodiment of the present invention applied to the accompanying drawings FIGS. 8A and 9 is a pressure rod 140 of a circular cross section, the trapezoidal cross section of the wider surface of the outer side can be formed as the pressure rod 140, as shown in FIG. 8B, and thus adhesive force can be heightened. Alternatively, as shown in FIG. 8C, the rhombic pressurizing rod 140 may be applied to fix the inner wall 52 of the groove 51 to be in close contact with a pointed surface. In addition, a suitable cross-sectional shape of all the pressure rods 140 in close contact with the inner wall 52 may be possible. That is, one side of the deformed circular cross section may be implemented by sharply forming each side, and may be fixed by using one side of a pentagonal form. All the pressure rods 140 may form contact surfaces that slip on the first and second inclined surfaces 112 and 122, and any one surface of the slip surface may form a needle bar that is in close contact with the inner wall 52 of the groove 51.

EXAMPLE 3

Figure 10:
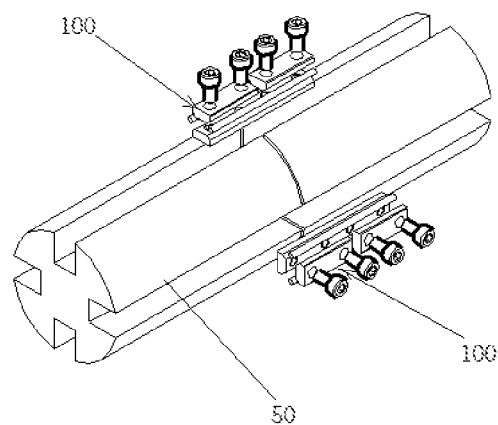
FIG. 10 is a perspective view of a disconnected state of the angular beam connecting apparatus according to the third embodiment of the present invention.
Figure 11A:
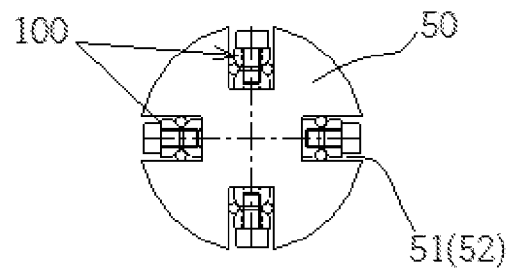
FIGS. 11A, 11B and 11C are cross-sectional views of a connected state of an angular beam connecting apparatus according to an embodiment of the present invention in which the connecting apparatus is implemented in the groove of the angular beam.
Figure 11B:
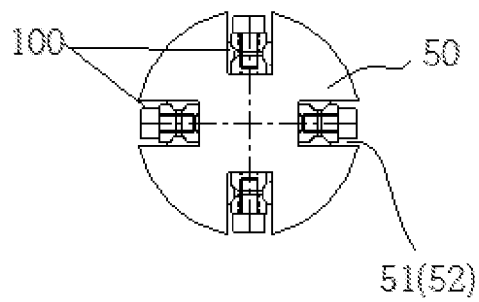
Figure 11C:
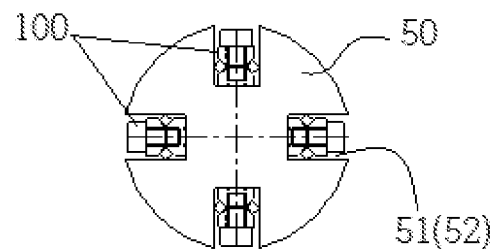

FIG. 9 is a perspective view of a connected state of an angular beam connecting apparatus according to a third embodiment of the present invention. FIG. 10 is a perspective view of a disconnected state of the angular beam connecting apparatus according to the third embodiment of the present invention. FIGS. 11A, 11B and 11C are cross-sectional views of a connected state of an angular beam connecting apparatus according to an embodiment of the present invention in which the connecting apparatus is implemented in the groove of the angular beam.

As illustrated in FIGS. 9 to 11C, a connecting apparatus 100 according to an embodiment of the present invention includes: a pair of upper members 110, a lower member 120, a plurality of pressure units 130, and a pair of pressure rods 140.

The upper member 110 is formed of a pair of upper members 110 but may be formed as one upper member 110. The upper member 110 may be formed of a hexahedron having a thin and long shape. The hexahedron of the upper member 110 forms a cross-sectional shape of widening upward and narrowing downward (longer upper and shorter lower trapezoid) on the basis of two shorter surfaces of four vertical surfaces (thickness), and first inclined surfaces (sloped surfaces) 112 are formed on both sides of this cross section. At least one first pressing hole 111 penetrating the upper and lower portions of the hexahedron is formed on the upper surface of the hexahedron, and a spiral is formed on an inner surface of the first pressing hole 111.

The lower member 120 is a hexahedron having a thin thickness in the same shape corresponding to longer than the combined length of the pair of upper members 110. The hexahedron of the lower member 120 forms a cross-sectional shape of narrowing upward and widening downward (shorter upper and longer lower trapezoid) on the basis of two shorter surfaces among four vertical surfaces and second inclined surfaces 122 corresponding to the first inclined surfaces 112 are formed on both sides of this cross section. At least one second pressing hole 112 penetrating the upper and lower portions corresponding to the first pressing hole 111 is formed on the upper surface of the hexahedron.

The pressure units 130 are bolts or the like having a thread of a predetermined length to be screwed through the first and second pressing holes 111 and 121, and The pressure units 130 are placed to penetrate the first and second pressing holes 111 and 112 and tightened to be screwed into the first and second pressing holes 111 and 112 (screw fit) in the state in which the upper and lower members 110 and 120 correspond to each other, such that a space "a" between the first and second inclined surfaces 112 and 122 of the upper and lower members 110 and 120 is narrowed.

The pressure rod 140 is provided between the first and second inclined surfaces 112 and 122 on both sides of the upper and lower members 110 and 120 to face each other so that the pressure rod 140 is gradually opened from the inside to the outside and is placed in the space "a" formed between the first and second inclined surfaces 112 and 122 at the time of assembly. When the pressure unit 130 is gradually pressed while being screw-fitted with the first and second pressure holes 111 and 121 in a state in which the upper and lower members 110 and 120 correspond to each other, The pressure rod 140 positioned between the first and second inclined surfaces 112 and 122 of the upper and lower members 110 and 120 is pushed out from the first and second inclined surfaces 112 and 122 that are in contact with each other up and down, and is in close contact with and connected with the inner wall surface 52 of the groove 51 of the angular beam 50.

Preferably, the spiral of the pressure unit 130 is carried out in a direction in which the upper and lower members 110 and 120 closely contact each other in a spiral direction of the first and second pressing holes 111 and 121. Although the lower spiral of the pressure unit 130 penetrates the first pressing hole 111 as it is, the second pressing hole 121 may be formed such that the lower spiral of the pressure unit 130 may be coupled to the second pressing hole 121 in a screw fit manner to raise the lower member 120. The screw fitting coupling structure of the pressure unit 130 and the first and second pressing holes 111 and 121 may use a known screw fitting structure using a spiral so that the upper and lower members 110 and 120 are closely contact with each other in a state where the upper and lower members 110 and 120 are laminated at a predetermined interval. The screw fitting structure of the pressure unit 130 and the pressing holes 111 and 121 may employ a number of known joining structures.

The angular beam connecting apparatus using the connecting apparatus 100 according to an embodiment of the present invention is implemented to make the ends of the angular beams 50 corresponding to face each other correspond to each other without gaps, and to have the connecting apparatus 100 interposed therebetween.

The whole implementation of the connection member 100 according to an embodiment of the present invention can be performed by being assembled in the longitudinal direction in the grooves 51 of the angular beams 50 from above as shown in FIG. 11.

The angular beam connecting apparatus for connecting the angular beams 50 to which the connecting apparatus 100 is applied is implemented as shown in FIGS. 11A, 11B and 11C, and can be fixed in close contact with the inner side walls 52 of both sides of the groove 51 through FIGS. 11A, 11B and 11C.

That is, as shown in FIG. 11A, the lower member 120 is placed with the second inclined surface 122 facing up, the pressure rod 140 of the circular cross section is placed on the second inclined surface 122, and the first inclined surfaces 112 of the pair of upper members 110 are disposed on the second inclined surface 122 so as to cover the second inclined surface 122 (a space "a" of a predetermined interval is formed between the upper and lower members 110 and 120).

Thereafter, the gaps between the upper and lower members 110 and 120 are gradually narrowed and the upper and lower members 110 and 120 are in close contact with each other by being screwed together while the pressure unit 130 is inserted into the first pressing hole 111 and the second pressing hole 121. At the same time, the pressure rods 140 located between the first and second inclined surfaces 112 and 122 are pushed outward and supported to be in close contact with the inner walls 52 of the groove 51. As the inner walls 52 of the angular beam 50 are supported by the close contact of both sides of the pressure rod 140, the two angular beams 50 corresponding to the longitudinal ends thereof accomplish a connection state. The connecting apparatus enables providing of an extending apparatus for extending the angular beams 50 such as linear angle members, profiles, etc. that are applied to all industries, and the length of the entire structure formed by the angular beams can be extended without welding. The disadvantages of the conventional connection method such as a connecting method by welding, a connecting method of forming a protruding jaw on both sides of the upper portion of the groove, and hooking and fixing as a hook structure inserted into the groove, and the like can be solved.

Meanwhile, although the pressure rod 140 of the connecting apparatus 100 according to an embodiment of the present invention applied to the accompanying drawings FIG. 11A is a pressure rod 140 of a circular cross section, the trapezoidal cross section of the wider surface of the outer side can be formed as the pressure rod 140, as shown in FIG. 11B, and thus adhesive force can be heightened. Alternatively, as shown in FIG. 11C, the rhombic pressurizing rod 140 may be applied to fix the inner wall 52 of the groove 51 to be in close contact with a pointed surface.

In addition, a suitable cross-sectional shape of all the pressure rods 140 in close contact with the inner wall 52 may be possible. That is, one side of the deformed circular cross section may be implemented by sharply forming each side, and may be fixed by using one side of a pentagonal form. All the pressure rods 140 may form contact surfaces that slip on the first and second inclined surfaces 112 and 122, and any one surface of the slip surface may form a needle bar that is in close contact with the inner wall 52 of the groove 51.

EXAMPLE 4

Figure 12:
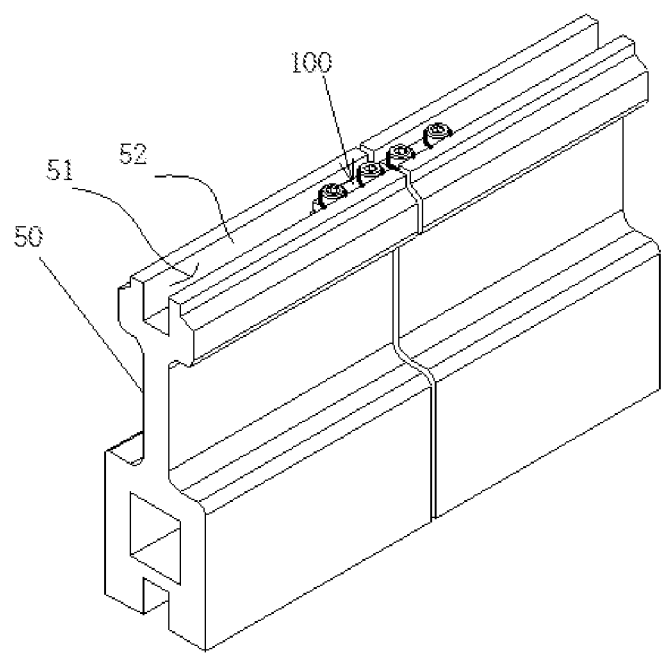
FIG. 12 is a perspective view of a connected state of an angular beam connecting apparatus according to a fourth embodiment of the present invention.
Figure 13:
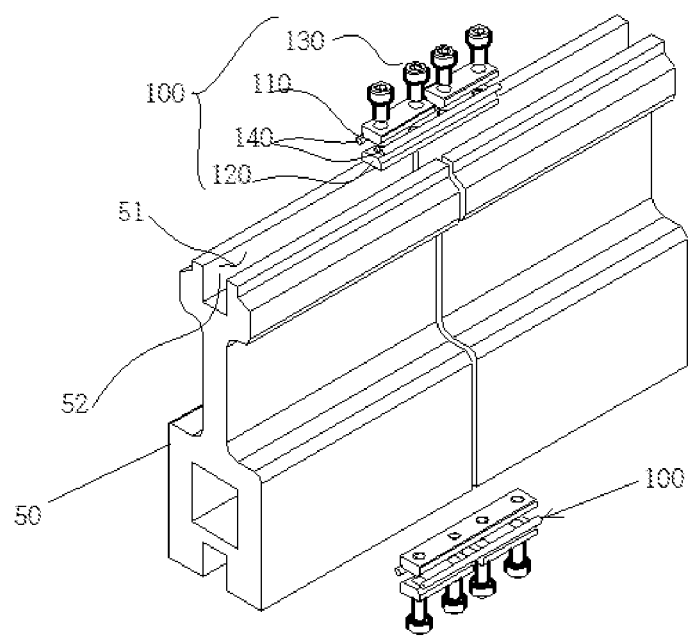
FIG. 13 is a perspective view of a disconnected state of the angular beam connecting apparatus according to the fourth embodiment of the present invention.
Figure 14A:
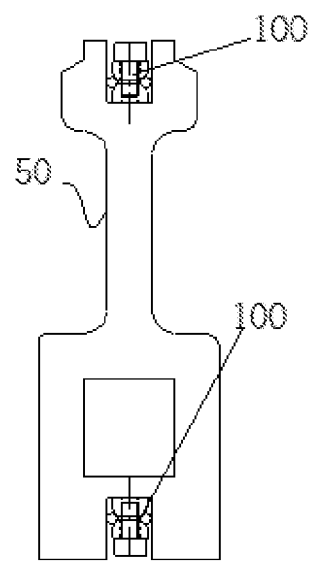
FIGS. 14A, 14B and 14C are cross-sectional views of a connected state of a rail-like angular beam connecting apparatus according to an embodiment of the present invention in which the connecting apparatus is implemented in the groove of the rail-like angular beam.
Figure 14B:
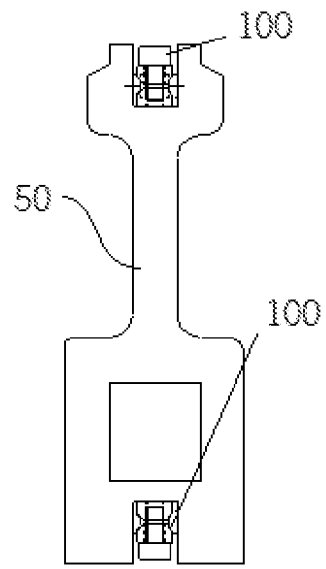
Figure 14C:
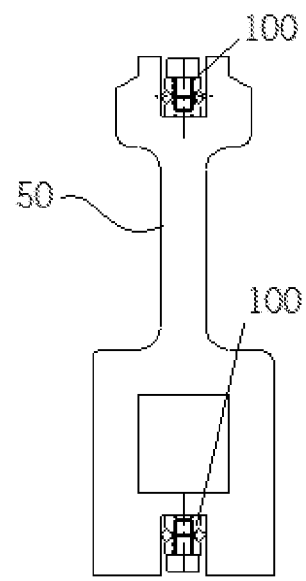

FIG. 12 is a perspective view of a connected state of an angular beam connecting apparatus according to a fourth embodiment of the present invention. FIG. 13 is a perspective view of a disconnected state of the angular beam connecting apparatus according to the fourth embodiment of the present invention. FIGS. 14A, 14B and 14C are cross-sectional views of a connected state of a rail-like angular beam connecting apparatus according to an embodiment of the present invention in which the connecting apparatus is implemented in the groove of the rail-like angular beam.

As illustrated in FIGS. 12 to 14C, a connecting apparatus 100 according to an embodiment of the present invention includes: a pair of upper members 110, a lower member 120, a plurality of pressure units 130, and a pair of pressure rods 140.

The upper member 110 is formed of a pair of upper members 110 but may be formed as one upper member 110. The upper member 110 may be formed of a hexahedron having a thin and long shape. The hexahedron of the upper member 110 forms a cross-sectional shape of widening upward and narrowing downward (longer upper and shorter lower trapezoid) on the basis of two shorter surfaces of four vertical surfaces (thickness), and first inclined surfaces (sloped surfaces) 112 are formed on both sides of this cross section. At least one first pressing hole 111 penetrating the upper and lower portions of the hexahedron is formed on the upper surface of the hexahedron, and a spiral is formed on an inner surface of the first pressing hole 111.

The lower member 120 is a hexahedron having a thin thickness in the same shape corresponding to equal to or longer than the combined length of the pair of upper members 110. The hexahedron of the lower member 120 forms a cross-sectional shape of narrowing upward and widening downward (shorter upper and longer lower trapezoid) on the basis of two shorter surfaces among four vertical surfaces and second inclined surfaces 122 corresponding to the first inclined surfaces 112 are formed on both sides of this cross section. At least one second pressing hole 112 penetrating the upper and lower portions corresponding to the first pressing hole 111 is formed on the upper surface of the hexahedron.

The pressure units 130 are bolts or the like having a thread of a predetermined length to be screwed through the first and second pressing holes 111 and 121, and The pressure units 130 are placed to penetrate the first and second pressing holes 111 and 112 and tightened to be screwed into the first and second pressing holes 111 and 112 (screw fit) in the state in which the upper and lower members 110 and 120 correspond to each other, such that a space "a" between the first and second inclined surfaces 112 and 122 of the upper and lower members 110 and 120 is narrowed.

The pressure rod 140 is provided between the first and second inclined surfaces 112 and 122 on both sides of the upper and lower members 110 and 120 to face each other so that the pressure rod 140 is gradually opened from the inside to the outside and is placed in the space "a" formed between the first and second inclined surfaces 112 and 122 at the time of assembly. When the pressure unit 130 is gradually pressed while being screw-fitted with the first and second pressure holes 111 and 121 in a state in which the upper and lower members 110 and 120 correspond to each other, The pressure rod 140 positioned between the first and second inclined surfaces 112 and 122 of the upper and lower members 110 and 120 is pushed out from the first and second inclined surfaces 112 and 122 that are in contact with each other up and down, and is in close contact with and connected with the inner wall surface 52 of the groove 51 of the angular beam 50.

Preferably, the spiral of the pressure unit 130 is carried out in a direction in which the upper and lower members 110 and 120 closely contact each other in a spiral direction of the first and second pressing holes 111 and 121. Although the lower spiral of the pressure unit 130 penetrates the first pressing hole 111 as it is, the second pressing hole 121 may be formed such that the lower spiral of the pressure unit 130 may be coupled to the second pressing hole 121 in a screw fit manner to raise the lower member 120. The screw fitting coupling structure of the pressure unit 130 and the first and second pressing holes 111 and 121 may use a known screw fitting structure using a spiral so that the upper and lower members 110 and 120 are closely contact with each other in a state where the upper and lower members 110 and 120 are laminated at a predetermined interval. The screw fitting structure of the pressure unit 130 and the pressing holes 111 and 121 may employ a number of known joining structures.

The angular beam connecting apparatus using the connecting apparatus 100 according to an embodiment of the present invention is implemented to make the ends of the two rail-like angular beams 50 corresponding to each other correspond to face each other without gaps, and to have the connecting apparatus 100 interposed therebetween.

The whole implementation of the connection member 100 according to an embodiment of the present invention can be performed by being assembled in the longitudinal direction in the grooves 51 of the rail-like angular beams 50 from above as shown in FIG. 13.

The angular beam connecting apparatus for connecting the rail-like angular beams 50 to which the connecting apparatus 100 is applied is implemented as shown in FIGS. 14A, 14B and 14C, and can be fixed in close contact with the inner side walls 52 of both sides of the groove 51 through FIGS. 14A, 14B and 14C.

That is, as shown in FIG. 14A, the lower member 120 is placed with the second inclined surface 122 facing up, the pressure rod 140 of the circular cross section is placed on the second inclined surface 122, and the first inclined surfaces 112 of the pair of upper members 110 are disposed on the second inclined surface 122 so as to cover the second inclined surface 122 (a space "a" of a predetermined interval is formed between the upper and lower members 110 and 120).

Thereafter, the gaps between the upper and lower members 110 and 120 are gradually narrowed and the upper and lower members 110 and 120 are in close contact with each other by being screwed together while the pressure unit 130 is inserted into the first pressing hole 111 and the second pressing hole 121. At the same time, the pressure rods 140 located between the first and second inclined surfaces 112 and 122 are pushed outward and supported to be in close contact with the inner walls 52 of the groove 51. As the inner walls 52 of the angular beam 50 are supported by the close contact of both sides of the pressure rod 140, the two angular beams 50 corresponding to the longitudinal ends thereof accomplish a connection state. The connecting apparatus enables providing of an extending apparatus for extending the angular beams 50 such as linear angle members, profiles, etc. that are applied to all industries, and the length of the entire structure formed by the angular beams can be extended without welding. The disadvantages of the conventional connection method such as a connecting method by welding, a connecting method of forming a protruding jaw on both sides of the upper portion of the groove, and hooking and fixing as a hook structure inserted into the groove, and the like can be solved.

Meanwhile, although the pressure rod 140 of the connecting apparatus 100 according to an embodiment of the present invention applied to the accompanying drawings FIG. 14A is a pressure rod 140 of a circular cross section, the trapezoidal cross section of the wider surface of the outer side can be formed as the pressure rod 140, as shown in FIG. 14B, and thus adhesive force can be heightened. Alternatively, as shown in FIG. 14C, the rhombic pressurizing rod 140 may be applied to fix the inner wall 52 of the groove 51 to be in close contact with a pointed surface.

In addition, a suitable cross-sectional shape of all the pressure rods 140 in close contact with the inner wall 52 may be possible. That is, one side of the deformed circular cross section may be implemented by sharply forming each side, and may be fixed by using one side of a pentagonal form. All the pressure rods 140 may form contact surfaces that slip on the first and second inclined surfaces 112 and 122, and any one surface of the slip surface may form a needle bar that is in close contact with the inner wall 52 of the groove 51.

EXAMPLE 5

Figure 15:
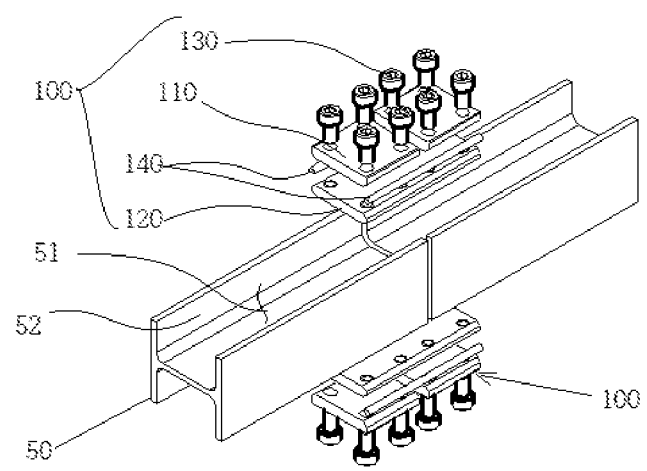
FIG. 15 is a perspective view of a disconnected state of the angular beam connecting apparatus according to the fourth embodiment of the present invention.
Figure 16:
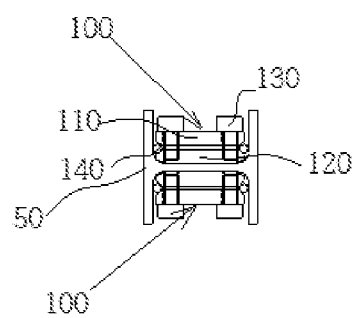
FIG. 16 is a cross-sectional view of a connected state of a rail-like angular beam connecting apparatus according to an embodiment of the present invention in which the connecting apparatus is implemented in the groove of the rail-like angular beam.
Figure 17A:
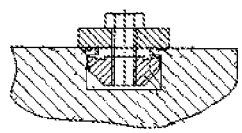
FIG. 17A is a cross-sectional view showing a groove structure of an angular beam for connecting and installing the angular beam with a groove formed above in the prior art and 17B is a plan view schematically showing the installation state thereof.
Figure 17B:
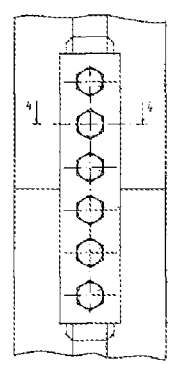

FIG. 15 is a perspective view of a disconnected state of the angular beam connecting apparatus according to the fourth embodiment of the present invention. FIG. 16 is a cross-sectional view of a connected state of a rail-like angular beam connecting apparatus according to an embodiment of the present invention in which the connecting apparatus is implemented in the groove of the rail-like angular beam.

As illustrated in FIGS. 15 and 16, a connecting apparatus 100 according to an embodiment of the present invention includes: a pair of upper members 110, a lower member 120, a plurality of pressure units 130, and a pair of pressure rods 140.

The upper member 110 is formed of a pair of upper members 110 but may be implemented as one upper member 110. The upper member 110 may be formed of a hexahedron having a thin and long shape. The hexahedron of the upper member 110 forms a cross-sectional shape of widening upward and narrowing downward (longer upper and shorter lower trapezoid) on the basis of one surface of four vertical surfaces (thickness) having the same length, and first inclined surfaces 112 are formed on both sides of this cross section. At least one first pressing hole 111 penetrating the upper and lower portions of the hexahedron is formed on the upper surface of the hexahedron, and a spiral is formed on an inner surface of the first pressing hole 111.

The lower member 120 is a hexahedron of the same shape corresponding to the pair of the upper members 110 to be longer than or equal to the combined length of the pair of the upper members 110. The hexahedron of the lower member 120 forms a cross-sectional shape of narrowing upward and widening downward (shorter upper and longer lower trapezoid) on the basis of two shorter surfaces among four vertical surfaces and second inclined surfaces 122 corresponding to the first inclined surfaces 112 are formed on both sides of this cross section. At least one second pressing hole 112 penetrating the upper and lower portions corresponding to the first pressing hole 111 is formed on the upper surface of the hexahedron.

The pressure units 130 are bolts or the like having a thread of a predetermined length to be screwed through the first and second pressing holes 111 and 121, and The pressure units 130 are placed to penetrate the first and second pressing holes 111 and 112 and tightened to be screwed into the first and second pressing holes 111 and 112 (screw fit) in the state in which the upper and lower members 110 and 120 correspond to each other, such that a space "a" between the first and second inclined surfaces 112 and 122 of the upper and lower members 110 and 120 is narrowed.

The pressure rod 140 is provided between the first and second inclined surfaces 112 and 122 on both sides of the upper and lower members 110 and 120 to face each other so that the pressure rod 140 is gradually opened from the inside to the outside and is placed in the space "a" formed between the first and second inclined surfaces 112 and 122. When the pressure unit 130 is gradually pressed while being screw-fitted with the first and second pressure holes 111 and 121 in a state in which the upper and lower members 110 and 120 correspond to each other, The pressure rod 140 positioned between the first and second inclined surfaces 112 and 122 of the upper and lower members 110 and 120 is pushed out from and by the first and second inclined surfaces 112 and 122 that are in contact with each other up and down, and is in close contact with and connected with the inner wall surface 52 of the groove 51 of the angular beam 50.

Preferably, the spiral of the pressure unit 130 is carried out in a direction in which the upper and lower members 110 and 120 closely contact each other in a spiral direction of the first and second pressing holes 111 and 121. Although the lower spiral of the pressure unit 130 penetrates the first pressing hole 111 as it is, the second pressing hole 121 may be formed such that the lower spiral of the pressure unit 130 may be coupled to the second pressing hole 121 in a screw fit manner to raise the lower member 120. The screw fitting coupling structure of the pressure unit 130 and the first and second pressing holes 111 and 121 may use a known screw fitting structure using a spiral so that the upper and lower members 110 and 120 are closely contact with each other in a state where the upper and lower members 110 and 120 are laminated at a predetermined interval. The screw fitting structure of the pressure unit 130 and the pressing holes 111 and 121 may employ a number of known joining structures.

The angular beam connecting apparatus for connecting the angular beams 50 to which the connecting apparatus 100 is applied may be implemented to be in close contact with both inner walls 52 of the groove 51 as shown in FIG. 16. In other words, as shown in the drawings, the angular beam connecting apparatus using the connecting apparatus 100 according to an embodiment of the present invention is implemented to make the ends of the angular beams 50 forming H-shaped cross section corresponding to each other correspond to face each other without gaps, and to sequentially arrange and insert the lower member 120, the pressure rods 140, and the upper members 110 of the connecting apparatus 100 to be interposed therebetween and to then be screw-fitted and fixed into the pressing holes 111 and 121 with the pressure units 130.

That is, as shown in FIG. 16, the lower member 120 is placed with the second inclined surface 122 facing up, the pressure rod 140 of the circular cross section is placed on the second inclined surface 122, and the first inclined surfaces 112 of the pair of upper members 110 are disposed on the second inclined surface 122 so as to cover the second inclined surface 122 (a space "a" of a predetermined interval is formed between the upper and lower members 110 and 120).

Thereafter, the gaps between the upper and lower members 110 and 120 are gradually narrowed and the upper and lower members 110 and 120 are in close contact with each other by being screwed together while the pressure unit 130 is inserted into the first pressing hole 111 and the second pressing hole 121. At the same time, the pressure rods 140 located between the first and second inclined surfaces 112 and 122 are pushed outward and supported to be in close contact with the inner walls 52 of the groove 51. As the inner walls 52 of the angular beam 50 are supported by the close contact of both sides of the pressure rod 140, the two angular beams 50 of H-shaped cross-section corresponding to the longitudinal ends thereof accomplish a connection state. The connecting apparatus enables providing of an extending apparatus for extending the angular beams 50 such as linear angle members, profiles, etc. that are applied to all industries, and the length of the entire structure formed by the angular beams can be extended without welding. The disadvantages of the conventional connection method such as a connecting method by welding, a connecting method of forming a protruding jaw on both sides of the upper portion of the groove, and hooking and fixing as a hook structure inserted into the groove, and the like can be simply solved.

Meanwhile, although not shown in the drawings, the pressure rod 140 in the connecting apparatus according to the present invention can increase the adhesion by forming a trapezoidal cross section of the wider outer side as shown and described in the above-described examples. Alternatively, the inner wall 52 of the groove 51 may be pointedly formed as a needle bar portion by applying a rhombic pressure rod 140 and the needle bar angle surface of the pressure bar 140 may be sharply stuck and fixed. In addition, a suitable cross-sectional shape of all the pressure rods 140 in close contact with the inner wall 52 may be possible. That is, one side of the deformed circular cross section may be implemented by sharply forming each side, and may be fixed by using one side of a pentagonal form. All the pressure rods 140 may form contact surfaces that slip on the first and second inclined surfaces 112 and 122, and any one surface of the slip surface may form a needle bar that is in close contact with the inner wall 52 of the groove 51.

Although embodiments of the present invention have been described with reference to the above features, those skilled in the art will appreciate that the present invention can be implemented in other specific forms without changing the technical spirit or essential features.

Therefore, the embodiments described above are to be understood in all respects as illustrative and not restrictive, and the scope of the present invention described in the above detailed description is represented by the following claims, and the meanings and the scope of the claims and all changes or modifications derived from equivalent concepts thereof should be construed as being included in the scope of the present invention.

What is claimed is:

1. An angular beam connecting apparatus for connecting angular beams each having a groove having both inner side walls formed therein, the angular beam connecting apparatus comprising:
   an upper member having at least one first pressing hole formed therein and at least one first inclined surface formed therein, respectively;
   a lower member having a second pressing hole formed therein in correspondence to the first pressing hole and a second inclined surface formed therein while facing the first inclined surface;
   pressure units that are screwed through the first and second pressing holes of the upper and lower members;
   at least one pressure rod located in the space ("a") formed between the first and second inclined surfaces by placing the first and second inclined surfaces of the upper and lower members to face each other,
   wherein the pressure units of the connecting member penetrate the first and second pressing holes to have the upper and lower members closely contact each other, and the at least one pressure rod located in the space ("a") between the first and second inclined surfaces is pushed outward and closely in contact with the inner walls of the angular beams.

2. The angular beam connecting apparatus of claim 1, wherein the angular beam includes a groove formed on at least one of the outer surfaces forming each surface.

3. The angular beam connecting apparatus of claim 1, wherein the angular beam includes at least one groove formed on the outer peripheral surface of a cylindrical cross section.

4. The angular beam connecting apparatus of claim 1, wherein the angular beam is a rail-like member including a groove formed in the upper and lower portions thereof for assembling the connecting member, and an extending portion formed between the upper and lower portions.

5. The angular beam connecting apparatus of claim 1, wherein the pressure rod has a circular cross section.

6. The angular beam connecting apparatus of claim 1, wherein the pressure rod has a trapezoidal cross section.

7. The angular beam connecting apparatus of claim 1, wherein the pressure rod has a rhombic cross section.

8. A connecting apparatus comprising:
   a pair of upper members having at least one first pressing hole formed therein and at least one first inclined surface formed therein, respectively;
   a lower member opposing the pair of upper members in which at least one second pressing hole is formed in correspondence to the at least one first pressing hole, and at least one second inclined surface is formed in correspondence to the at least one first inclined surface so as to form a space in which the first and second inclined surfaces are opened outward;
   a plurality of pressure units for tightly coupling the upper and lower members by coupling the first and second pressing holes of the upper and lower members in a screw engagement manner; and
   at least one pressure rod in which the first and second inclined surfaces of the upper and lower members are arranged to face each other to be placed in a space "a" formed between the first and second inclined surfaces so that the upper and lower members are in close contact with each other and the space "a" is gradually narrowed and the at least one pressure rod is pushed outward.

* * * * *